United States Patent
Murofushi et al.

(10) Patent No.: US 6,492,592 B1
(45) Date of Patent: *Dec. 10, 2002

(54) ELECTRICITY SUPPLYING STRUCTURE ON MOTOR VEHICLE SLIDING DOOR

(75) Inventors: Satoru Murofushi, Shizuoka (JP); Kenichi Doshita, Shizuoka (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/480,137

(22) Filed: Jan. 10, 2000

(30) Foreign Application Priority Data

Jan. 12, 1999 (JP) .......................... 11-005314

(51) Int. Cl.[7] ................................. H02G 3/00
(52) U.S. Cl. ...................... 174/72 A; 174/70 R; 439/34
(58) Field of Search ............................. 174/72 A, 68.3, 174/72 R, 71 R, 70 R, DIG. 9; 296/146.1; 439/11, 34, 502, 503; 49/152, 158, 176, 246

(56) References Cited

U.S. PATENT DOCUMENTS

| | | | | |
|---|---|---|---|---|
| 4,887,390 A | * | 12/1989 | Boyko et al. ............... | 49/214 |
| 4,992,629 A | * | 2/1991 | Morais ...................... | 174/69 |
| 5,069,000 A | * | 12/1991 | Zuckerman ................. | 49/28 |
| 6,009,671 A | * | 1/2000 | Sasaki et al. ................ | 49/352 |
| 6,070,931 A | * | 6/2000 | Yamaguchi et al. ....... | 296/146.7 |
| 6,141,908 A | * | 11/2000 | Bowen ....................... | 49/281 |

FOREIGN PATENT DOCUMENTS

JP  4-124555  11/1992

* cited by examiner

Primary Examiner—Dean A. Reichard
Assistant Examiner—W. David Walkenhorst
(74) Attorney, Agent, or Firm—Armstrong, Westerman & Hattori, LLP

(57) ABSTRACT

An electricity supplying structure on motor vehicle sliding door, is provided, which includes: a sliding door; a guide rail provided on the sliding door; a slider to slidably engage the guide rail; and a wiring harness secured to the slider and extending to a vehicle body side; wherein a bent portion is formed on the wiring harness between the slider and the vehicle body side. The structure further includes a wiring harness supporting guide provided over the guide rail for hanging the wiring harness therefrom toward the slider and also a reel to pull the slider in a single direction. The guide rail is a plate having a slit for the slider. The structure further includes a coil member to be fitted on the whole bent portion of the wiring harness or the coil member may be arranged on each of both end portions of the bent portion. In the structure, the wiring harness is of a tough-rubber sheath cable, and one end of the bent portion of the wiring harness may be connected to a connector to be coupled with a mating connector secured to the vehicle body. Substituting for the wiring harness supporting guide the reel, the structure may include a pair of linking arms arranged on an upper side of the guide rail and linked to each other, one of the linking arms being connected to the slider and the other of the linking arms being connected to an end side of the guide rail, wherein the wiring harness is arranged on the linking arms. Thus, a structure, wherein a connecting position between the door side wiring harness and the body side wiring harness remains still when the sliding door is opened or closed, is realized.

20 Claims, 11 Drawing Sheets

ELECTRICITY SUPPLYING STRUCTURE ON MOTOR VEHICLE SLIDING DOOR

BACKGROUND OF THE INVENTION

1. Field of the Invention

The present invention generally relates to an electricity supplying structure on motor vehicle sliding door and more particularly, to an electricity supplying structure on motor vehicle sliding door wherein a sliding block to which a door side wiring harness is secured engages slidably a guide rail provided on a motor vehicle sliding door so that a connecting position between the door side wiring harness and the body side wiring harness remains still when the sliding door is opened or closed.

2. Description of the Related Art

Various means for connecting a door the wiring harness provided for auxiliary units such as a power window motor, a door locking unit, a speaker, and the like installed in a sliding door of a motor vehicle to a body side (i.e. an electricity supply side) wiring harness have been provided, conventionally.

FIG. 16 shows, for an example, a prior art electricity supplying structure on motor vehicle sliding door disclosed in Japanese U. M. Reg. Application Laid-open No. 4-124555. Referring to FIG. 16, auxiliary units 102 in the sliding door 101 are connected to a wiring harness 104 through a controller 103, and the end of the wiring harness 104 is connected to a contact point 105 provided on the door front end portion. Another contact point 107 connected to a battery 109 through a wiring harness 108 is provided on the body 106. The contact point 107 is connected to the contact point 105 through a movable contact point (not shown) provided for dustproofing and waterproofing.

With respect to the above structure, however, electric connection is made only when the sliding door 101 is closed, and accordingly the auxiliary units installed thereon can not operate in case that the sliding door 101 opens even a little. And, the movable contact point (not shown), which causes a double contact points, increases contact resistance, thereby lowering contact reliability.

Also, Japanese U. M. Reg. Application Laid-open No. 5-28893 discloses another electricity supplying structure on building door (not shown), wherein a pair of tubular arms are linked with a lining axis, one of the arms is fixed to a building door, the other of the arms is fixed to a building, and an electric wire is put through the arms.

The above structure, however, cannot be applied to a motor vehicle sliding door which moves two-dimensionally or three-dimensionally on opening or closing.

In order to solve the above problems, other electricity supplying structures on motor vehicle sliding door shown in FIGS. 17A, 17B, 18A, and 18B are disclosed in Japanese Patent Application Laid-open No. 7-222274.

In the structure shown in FIGS. 17A and 17B, a supporting bar 113 is provided along a guide rail 112 attached to a portion of a vehicle body 117 relative to a sliding door 111, and an electric wire (i.e. a wiring harness) 114 spirals on the supporting bar 113. One end of the electric wire 114 is connected to a speaker 116 installed in the sliding door 111 by way of a hinge 115 and the other end of the electric wire 114 is connected to an audio set (not shown) installed on the vehicle body 117. In a door-closed state of FIG. 17A the electric wire 114 extends along the supporting bar 113, and in a door-opened state of FIG. 17B the electric wire 114 is compressed.

And, in the structure shown in FIGS. 18A and 18B, a reel 120 capable of winding and releasing an electric wire (i.e. a wiring harness) 119 during opening-closing movement of a sliding door 118 is provided on a vehicle body 121. One end of the electric wire 119 is connected to a speaker 123 installed in the sliding door 119 by way of a hinge 122 and the other end of the electric wire 119 is connected to an audio set (not shown) installed on the vehicle body 121. In a door-closed state of FIG. 18A the electric wire 119 extends from the reel 120, and in a door-opened state of FIG. 18B the electric wire 119 is wound by the reel 120.

With respect to the structure shown in FIGS. 17A and 17B, however, the spiral electric wire 114 requires a longer electric wire, which causes a higher electric loss. And, a wiring harness having electric wires with a larger diameter or having a larger number of electric wires, which has a poor bending property and requires a larger accommodation space, can not be applied to this method.

And, with respect to the structure shown in FIGS. 18A and 18B, however, a complicated mechanism for preventing the electric wire 119 from twisting is required. And also, a wiring harness having electric wires with a larger diameter or having a larger number of electric wires, which has a poor bending property and requires a larger accommodation space, can not be applied to this method. Further, with respect to the structures shown in FIGS. 17A, 17B, 18A, and 18B, since the electric wires 114,119 are bent and extended iteratively, conductors of the electric wires 114,119 are likely to be damaged.

SUMMARY OF THE INVENTION

In view of the foregoing, an object of the present invention is to provide an electricity supplying structure on motor vehicle sliding door which can solve the above-described problems, wherein a slider, to which a door side wiring harness is secured, engages slidably a guide rail provided on a motor vehicle sliding door so that a connecting position between the door side wiring harness and the body side wiring harness remains still when the sliding door is opened or closed.

In order to achieve the above-described object, as a first aspect of the present invention, an electricity supplying structure on motor vehicle sliding door in accordance with the present invention includes: a sliding door; a guide rail provided on the sliding door; a slider to slidably engage the guide rail; and a wiring harness secured to the slider and extending to a vehicle body side; wherein a bent portion is formed on the wiring harness between the slider and the vehicle body side.

As a second aspect of the present invention, in the structure with the above first aspect, the electricity supplying structure further includes a wiring harness supporting guide provided over the guide rail for hanging the wiring harness from the wiring harness supporting guide toward the slider.

As a third aspect of the present invention, in the structure with the above second aspect, the electricity supplying structure further includes a reel to pull the slider in a single direction.

As a fourth aspect of the present invention, an electricity supplying structure on motor vehicle sliding door in accordance with the present invention includes: a sliding door; a guide rail provided on the sliding door; a slider to slidably engage the guide rail; a pair of linking arms being linked to each other, one end of the linking arms being connected to the slider and the other end of the linking arms being connected to the sliding door; and a wiring harness arranged by way of the pair of linking arms to the slider and extending to a vehicle body, wherein a bent portion is formed on the wiring harness between the slider and the vehicle body.

As a fifth aspect of the present invention, in the structure with the above fourth aspect, the pair of linking arms are arranged on an upper side of the guide rail.

As a sixth aspect of the present invention, in the structure with any one of the above aspects, the guide rail is a plate having a slit and the slider has a supporting axis to slide in the slit.

As a seventh aspect of the present invention, in the structure with either one of the above fourth and fifth aspects, the one of the pair of linking arms is connected to the slider by means of an axis portion and the axis portion engages the slit of the guide rail.

As an eighth aspect of the present invention, in the structure with any one of the above aspects, the electricity supplying structure further includes a coil member to be fitted on the bent portion of the wiring harness.

As a ninth aspect of the present invention, in the structure with the above eighth aspect, the coil member is arranged on each of both end portions of the bent portion.

As a tenth aspect of the present invention, in the structure with any one of the above aspects, the wiring harness is of a tough-rubber sheath cable.

As an eleventh aspect of the present invention, in the structure with any one of the above aspects, one end of the bent portion of the wiring harness is connected to a connector to be coupled with a mating connector secured to the vehicle body side.

According to the above-described structure of the present invention, the following advantages are provided.

(1) Since the slider remains substantially still relative to the vehicle body when the sliding door is opened or closed and simultaneously since the bent portion is provided on the wiring harness between the slider and the vehicle body, the wiring harness can smoothly respond to three-dimensional opening-closing movement of the sliding door, thereby preventing extension and shrinkage of the wiring harness and consequently preventing damage of the wiring harness. And, since length of the wiring harness can be shorter, an electric loss can be less.

(2) Since the structure of hanging the wiring harness from the wiring harness supporting guide to the slide is simple, a required space in the door thickness direction can be small, thereby enabling the present structure to be applied to the sliding door of a thin type.

(3) Since the slider is pulled by the reel and simultaneously receives resilience of the bent portion of the wiring harness, the slider can more securely remains substantially still relative to the vehicle body when the sliding door is opened or closed and also during a run of the vehicle, thereby preventing the wiring harness from swinging, slackening, wearing, making a noise, or the like, while realizing a simple structure.

(4) Since a pair of linking arms help the slider slide, the slider can smoothly move for remain itself still relative to the vehicle body, thereby protecting the bent portion of the wiring harness, while realizing a simple structure. And, since the wiring harness is supported by the linking arms, the wiring harness is prevented from hanging down and tangling when the sliding door is opened or closed, thereby protecting the wiring harness from wear due to contact and friction. Also, since the wiring harness bends integrally with the linking arms when the sliding door is opened or closed, the wiring harness can be bent smoothly.

(5) Since the linking arms are likely to open each other due to their own weight, the slider can be smoothly and securely shifted to the rear end side of the guide rail.

(6) Since the guide rail is a plate, the sliding door can be thin, and since the supporting axis of the slider slides in the slit, the slider can smoothly and securely move.

(7) The axis portion of one of the linking arms enables the one of the linking arms to smoothly pivot on the slider and also enables the slider to smoothly and securely slide along the guide rail.

(8) Since coil member is put around the bent portion of the wiring harness, the bent portion is protected from wear or the like, is kept in a smoothly bent shape, and is prevented from being folded or from winding caused by movement of the slider.

(9) Since the coil member is arranged on each of both end portions of the bent portion, the corresponding portions of the bent portion can be protected from wear or the like and simultaneously form-retaining effect of the bent portion can be improved.

(10) Since the tough-rubber sheath cable used as the wiring harness enables the wiring harness to have a completely circular cross-section, the wiring harness should have a uniform bending property in all directions, thereby facilitating arranging work thereof and enabling the wiring harness to have a larger number of electric wires for auxiliary units therein. And, the tough-rubber sheath cable has a good form-retaining property suitable for the bent portion and also can facilitate end-treating work thereof such as cutting, peeling, and pressure-welding to a terminal.

The above and other objects and features of the present invention will become more apparent from the following description taken in conjunction with the accompanying drawings.

DESCRIPTION OF THE PREFERRED EMBODIMENTS

Embodiments of the present invention will now be described in further detail with reference to the accompanying drawings.

FIGS. 1–9 show a first embodiment of an electricity supplying structure (or mechanism) on motor vehicle sliding door in accordance with the present invention.

Figure 1:
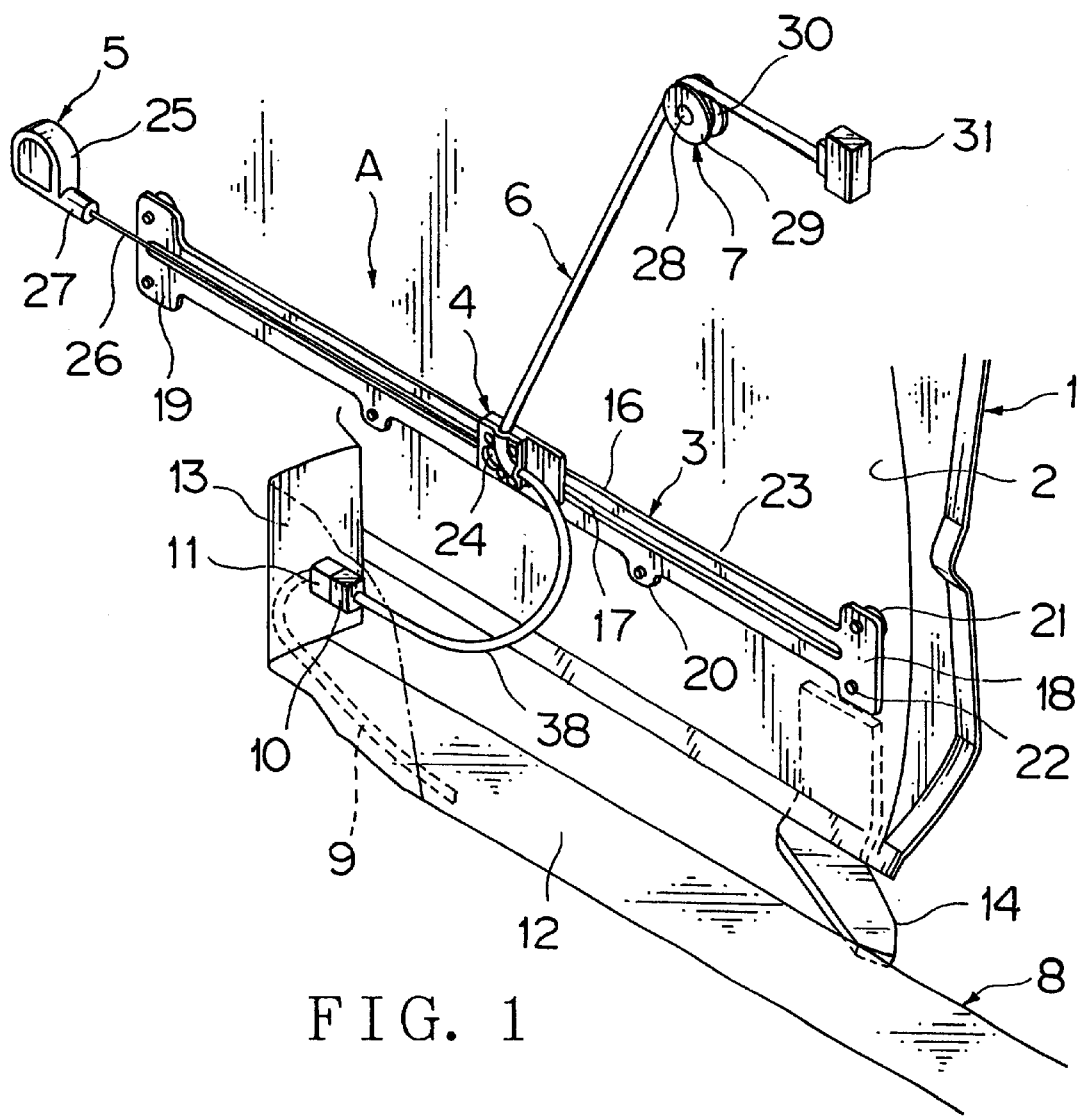
FIG. 1 is a perspective view showing a first embodiment of an electricity supplying structure on motor vehicle sliding door in accordance with the present invention.

As shown in FIG. 1, a sliding door 1 is provided with a horizontal guide rail 3 on a lower portion of an inner panel 2, and a guide rail 3 is engaged with a sliding block (i.e. a slider) 4 slidably. And, the sliding block 4 is pulled by a reel 5 rearward, namely in a door-opening direction. A middle portion of a door side wiring harness 6 is fixed to the sliding block 4. One of the wiring harness 6 is supported by a guide roller (i.e. a guide portion) 7 and the other is connected to a body side wiring harness 9 by means of connectors 10,11 on a body 8 side (i.e. a battery side), while bending in a substantially U-shape. In the description a vehicle running-direction is defined as "front".

The guide rail 3, the sliding block 4, the reel 5, and the guide roller 7 constitute an electricity supplying mechanism A on motor vehicle sliding door of the present embodiment. The reel 5 is fixed to the inner panel 2 at the rearward of the guide rail 3, and the guide roller 7 is rotatable secured to the inner panel 2 in the vertically middle portion thereof. The connectors 10,11 of the door side and body side wiring harnesses 6,9 are fixed inside a vertical wall 13 of a step portion 12 of the body 8. The sliding door 1 slidably engages a rail 15 (FIG. 7) provided on the body 8 by means of a hinge roller 14 at the lower end of the sliding door 1.

The guide rail 3 is formed with a slit 17 in the vertical middle of a straight plate portion 16, and the plate portion 16 is provided with secured portions 18–20 at the both ends and in the horizontal middle thereof. Each of the secured portions 18–20 is fixed to the inner panel 2 with a ring spacer 21 and a bolt 22, which spacer 21 makes a gap 23 between the inner panel 2 and the guide rail 3. And, the slit 17 of the guide rail 3 is engaged with a supporting axis 24 of the sliding block 4, that is, a flange portion (not shown) formed at the end of the supporting axis 24 is positioned in the gap 23 at the back of the guide rail 3. For example, the supporting axis 24 is provided with a bearing (not shown) on the periphery so that the sliding block 4 can smoothly move along the slit 17.

The reel 5 has a spring means (not shown) to wind a wire 26 inside a reel assembly 25 so that the wire 26 extending from a nozzle 27 is pulled all the time. The end of the wire 26 is connected to the rear end of the sliding block 4 for pulling the sliding block 4 rearward all the time. The reel 5 is provided for easier slide of the sliding block 4 rearward when the sliding door 1 is closed. Tensile force due to the reel 5 is in a range of at least straightening the door side wiring harness 6.

The guide roller (i.e. a wiring harness supporting guide) 7 consists of an axis portion 28 fixed to the inner panel 2 above the guide rail 3 and a roller 29 being rotatable around the axis portion 28 by means of, for example, a bearing and having a groove 30 with a semicircular cross-section for the door side wiring harness 6. A guide shaft (not shown) (i.e. another wiring harness supporting guide) having the similar groove may substitute for the rotatable guide roller 7.

The door side wiring harness 6 swings due to a movement of the sliding block 4 in a state of hanging down from the guide roller 7. A front end portion of the wiring harness 6 horizontally shortly extends forward from the guide roller 7 and is connected to a connector 31 which is coupled with a mating connector connected to a wiring harness for auxiliary units (not shown) such as a power window motor, a door locking unit, a speaker, and the like mounted inside the sliding door. The connector 31 is fixed to the inner panel 2.

A lower portion of the wiring harness 6, that is, a bent portion 38 formed in a substantially U-shape between the sliding block 4 to the body 8 side, bends forward and is connected to a connector 10 which is coupled with a mating connector 11 connected to the body side wiring harness 9 as an electricity supplying line. The body side wiring harness 9 extends forward to a battery side along an inside of a wall of the step portion 12. For example, the connector 10 is of male type and having a female terminal (not shown) inside a connector housing of synthetic resin, and the connector 11 is of female type and having a male terminal (not shown) inside a connector housing.

Figure 2:
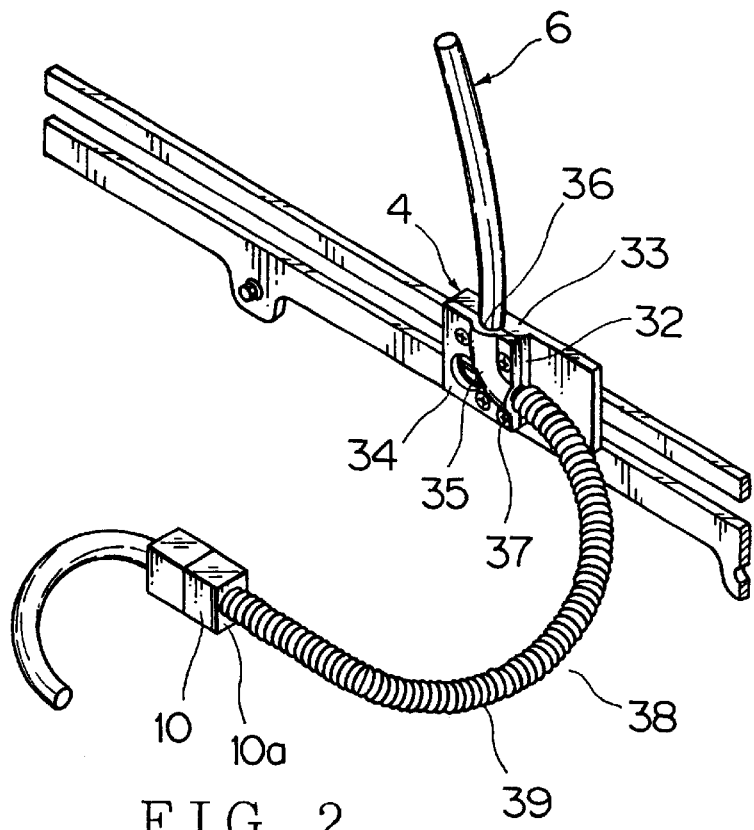
FIG. 2 is a perspective view showing an embodiment of a bent portion of a wiring harness.

As shown in FIG. 2, the sliding block 4 is formed in rectangle and has a step portion 32 in the horizontal middle thereof. The door side wiring harness 6 projects forward from the step portion 32 and bends substantially downward. The rear half portion of the sliding block 4 is formed thick as a thick portion 33 to which a pressing plate 34 is secured for putting the wiring harness 6 therebetween. The pressing plate 34 is formed with an arched portion 35 bulging outward and bending by approximately 90 degrees, and the thick portion 33 is provided with a groove 36 relative to the arched portion 35. And, the pressing plate 34 is secured to the thick portion 33 with small screws 37, and the wiring harness 6 is put between the groove 36 and the arched portion 35.

A coil spring (i.e. a coil member) 39 is put around the bent portion 38 of the door side wiring harness 6. The coil spring 39 protects the bent portion 38 against wear or the like, keeps the bent portion 38 in a smoothly bent shape, and prevents the bent portion 38 from being folded or from winding caused by movement of the sliding block 4 thereby to prevent a breakage of the bent portion 38.

Both ends of the coil spring 39 push the step portion 32 of the sliding block 4 and an end plane 10a of the connector 10, respectively, due to its spring force without parting from the step portion 32 and the end plane 10a. The both ends of the coil spring 39 may be secured to the sliding block 4 and the connector 10 by an engaging means (not shown). The coil spring 39 with an inner diameter not larger than an outer diameter of the wiring harness 6 may be fitted on the periphery of the wiring harness 6.

Figure 3:
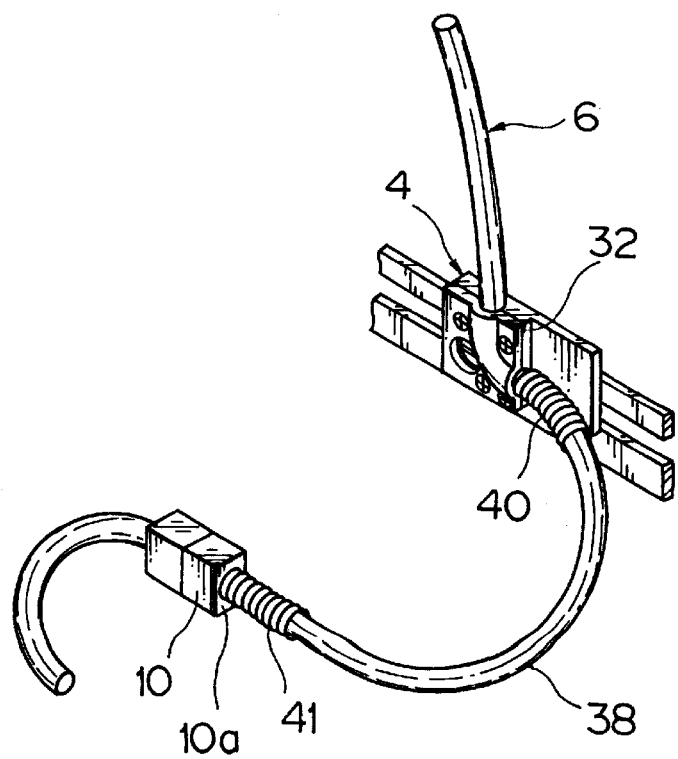
FIG. 3 is a perspective view showing another embodiment of a bent portion of a wiring harness.

As shown in FIG. 3, coil springs (i.e. as a coil member) 40,41 may partially be provided at a sliding block 4 side and a connector 10 side of the bent portion 38. That is, the ends of the coil springs 40,41 are secured to the step portion 32 of the sliding block 4 and the end plane 10a of the connector 10. Similarly to the embodiment shown in FIG. 2, the coil springs 40,41 may be fitted on the periphery of the bent portion 38. Since the both end portions of the bent portion 38 are supported by the coil springs 40,41, the bent portion 38 are kept in a U-shape against movement of the sliding block 4, thereby getting similar effects as of the embodiment shown in FIG. 2.

Figure 4:
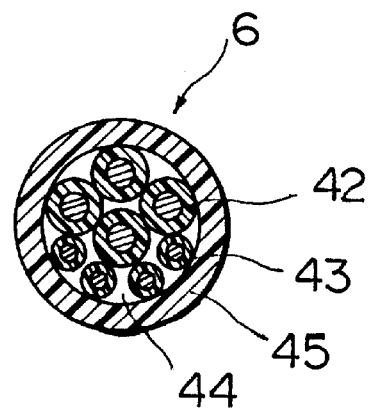
FIG. 4 is a cross-sectional view showing a tough-rubber sheath cable as an embodiment of a wiring harness.

As shown in FIG. 4, the wiring harness 6 is of a tough-rubber sheath cable in the present embodiment. The tough-rubber sheath cable, as defined in C3327 of Japanese Industrial Standard for example, consists of a plurality of such electric wires as shown with 42,43, an insulator 44 such as a foamed polyethylene filling the space, and a vinyl insulating sheath 45.

Since the tough-rubber sheath cable enables the wiring harness 6 to have a completely circular cross-section, the wiring harness 6 should have a uniform bending property in all directions, thereby facilitating arranging work thereof from the guide roller 7 (FIG. 1) to the connector 10 through the sliding block 4. This wiring harness 6 also has a good form-retaining property suitable for the bent portion 38, and also facilitates end-treating work thereof such as cutting, peeling, and pressure-welding to a terminal.

Figure 5:
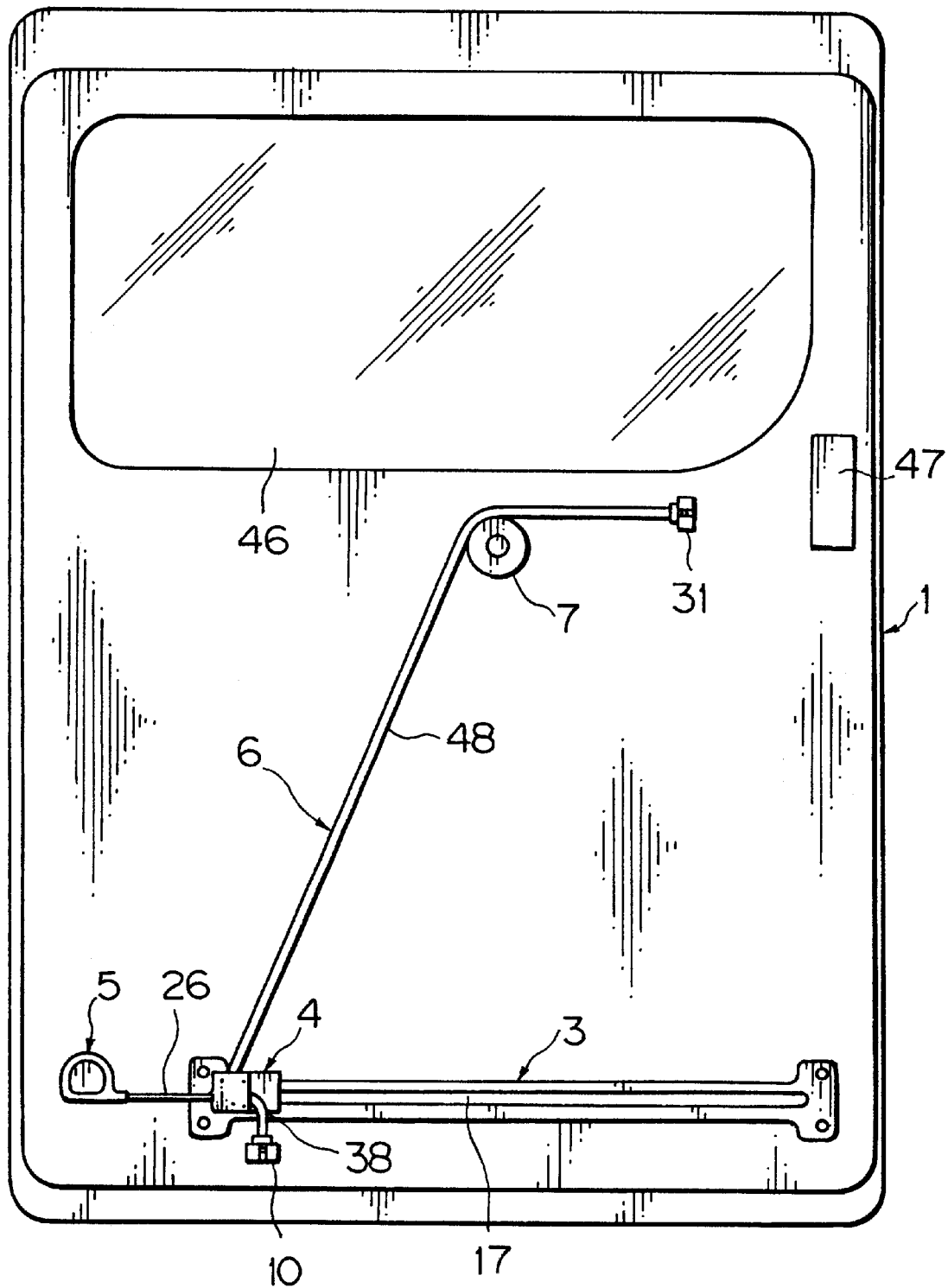
FIG. 5 is a front view of a sliding door in a closed state.

As shown in FIG. 5, in a closed state of the sliding door 1 the sliding block 4 is pulled by the wire 26 of the reel 5 and is positioned at the rear end portion of the guide rail 3. And, the door side wiring harness 6 raises forwardly aslant from the sliding block 4 and extends to the connector 31 by way of the guide roller 7. The supporting axis 24 (FIG. 1) of the sliding block 4 is positioned at the rear end, or near thereof, of the slit 17 of the guide rail 3. Since the sliding block 4 is pulled by the reel 5, movement of the sliding block 4 is prevented during a run of the vehicle, thereby preventing the door side wiring harness 6 from swinging, slackening, wearing, making a noise, or the like caused by the slack.

As described above, the bent portion 38 (FIG. 1) of the wiring harness 6 extends from the sliding block 4 to the body side, which bent portion 38 is connected to the connector 10 mounted to the step portion 12 of the body 8. In FIG. 5, reference numerals 46 and 47 indicate a window glass and an opening lever, respectively.

Figure 6:
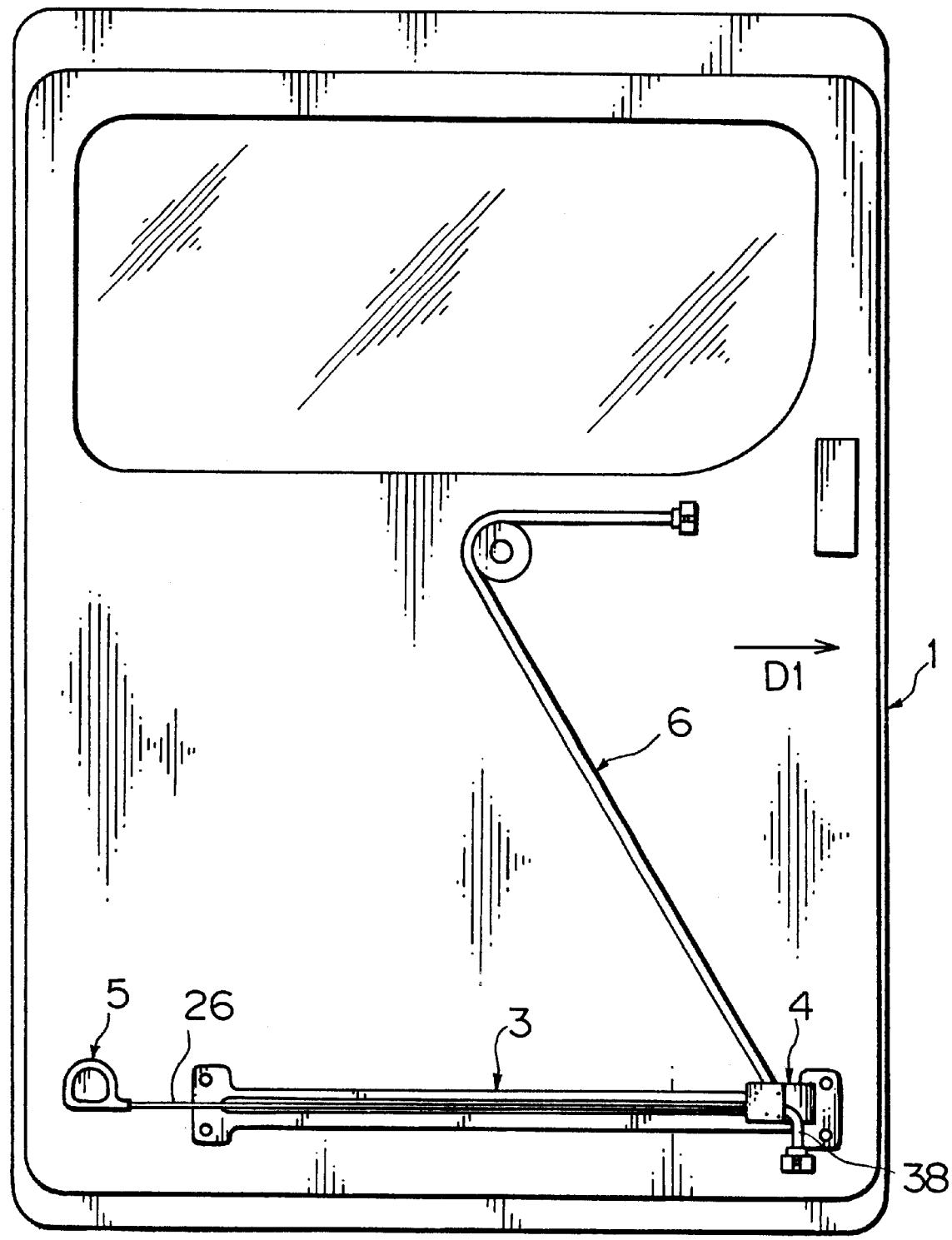
FIG. 6 is a front view of the sliding door in an opened state.

As shown in FIG. 6, since the bent portion 38 of the wiring harness 6 is connected to the body 8, the sliding block 4 is positioned at the front end of the guide rail 3 in an opened state of the sliding door 1. Actually, the sliding block 4 remains the same position as of closed state of the sliding door 1 in FIG. 5, while the sliding door 1 has shifted rearward. The wire 26 of the reel 5 is extended and pulls the sliding block 4 rearward and, however, the sliding block 4 remains still due to a suitable stiffness of the bent portion 38 of the wiring harness 6.

As shown in FIG. 6, the reel 5 makes the sliding block 4 smoothly slide rearward on closing the sliding door 1 in an arrow D1 direction. When the sliding door 1 is closed or opened, though the wiring harness 6 swings between the guide roller 7 and the sliding block 4, the guide roller 7 supports the swinging wiring harness 6 naturally and a bending movement of the wiring harness 6 over the guide roller 7 can be smoothly done. Since the wiring harness 6 swings and slackens, a slackening absorption mechanism (not shown) to pull a swing portion 48 (FIG. 5) forward or rearward may be provided.

Figure 7:
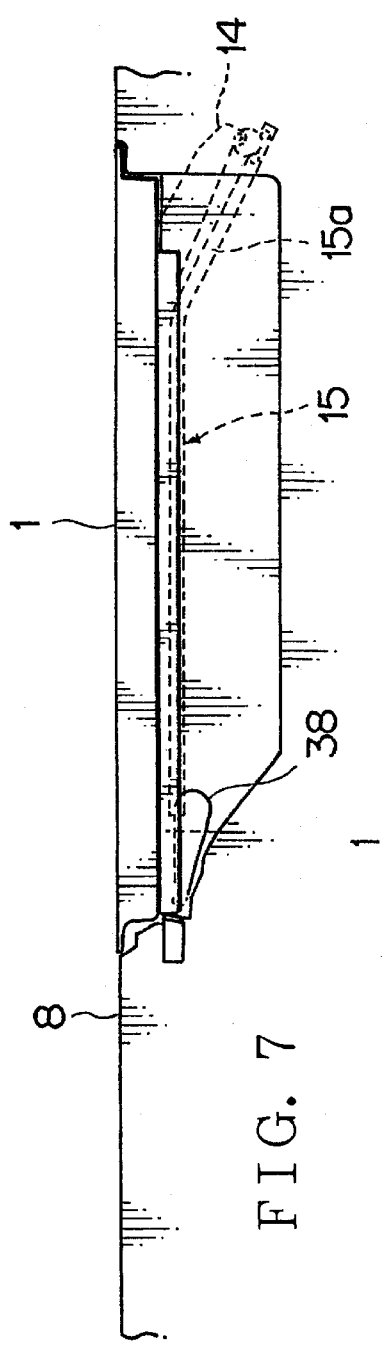
FIG. 7 is a plan view of the sliding door in the closed state.

As shown in FIG. 7, the sliding door 1 is positioned, in the closed state thereof, with the outer surface thereof being in the same plane as of the body 8. The hinge roller 14 at a lower end side of the sliding door 1 is positioned at the front end of a slant portion 15a of the rail 15. The bent portion 38 of the door side wiring harness 6 (FIG. 1) is located at the rear end of the sliding door 1 in a substantially U-shape.

Figure 8:
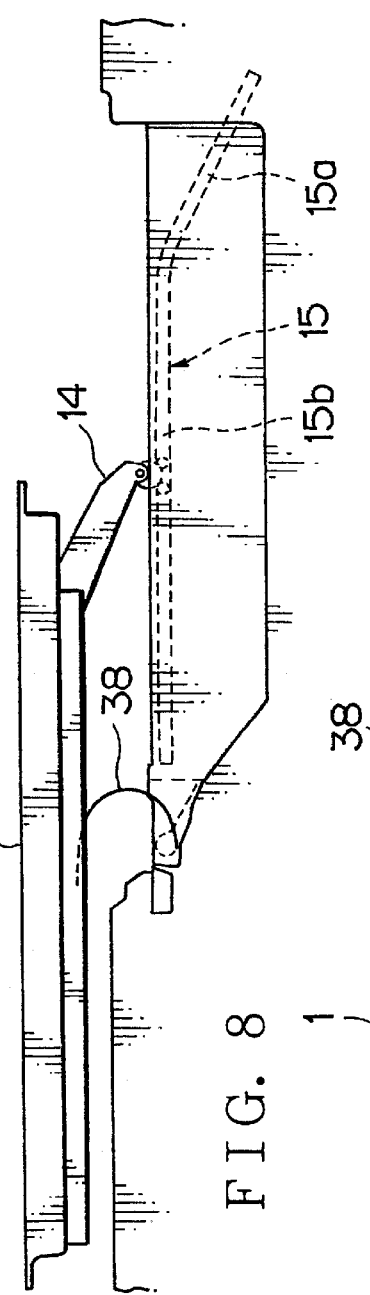
FIG. 8 is a plan view of the sliding door on the way to open.

As shown in FIG. 8, on the way to the opened state of the sliding door 1, the sliding door 1 projects outward due to the bent rail 15. The sliding block 4 (FIG. 6) is also on the way on the guide rail 3 (FIG. 6) of the sliding door 1 and the bent portion 38 of the wiring harness 6 (FIG. 1) bends in a widely opened U-shape. The hinge roller 14 shifts from the slant portion 15a of the rail 15 to its straight portion 15b.

Figure 9:
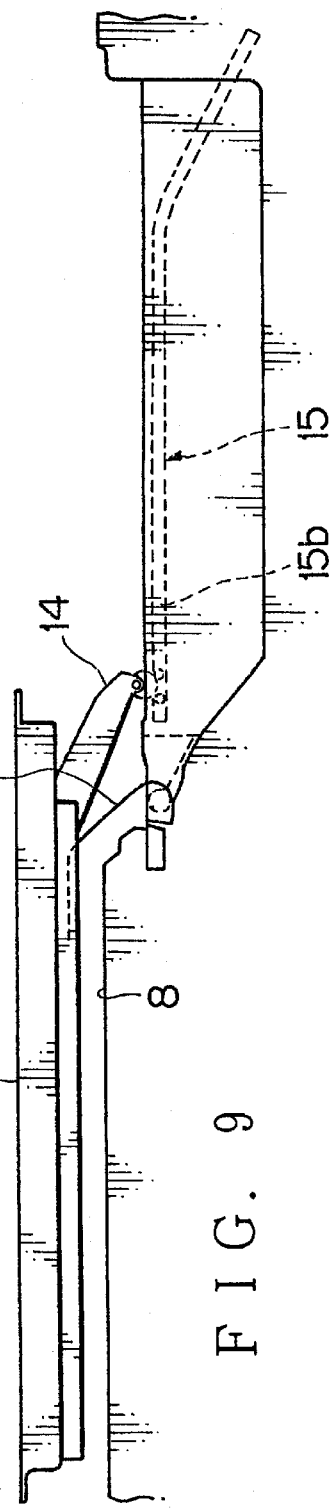
FIG. 9 is a plan view of the sliding door in the opened state.

As shown in FIG. 9, the sliding door 1 is positioned, in the opened state thereof, parallel to the outer surface of the body 8, and the hinge roller 14 is positioned at a rear end side of the straight portion 15b of the rail 15. The sliding block 4 (FIG. 6) is located at the front end side of the sliding door 1, and the bent portion 38 of the wiring harness 6 (FIG. 1) is pulled rearward a little.

According to the present embodiment, since the bent portion 38 is formed on the door side wiring harness 6 (i.e. the tough-rubber sheath cable), the door side wiring harness 6 can smoothly respond to three-dimensional opening-closing movement of the sliding door 1. And, since the structure of hanging the door side wiring harness 6 from the sliding door 1 and applying the sliding block 4 along with the reel 5 is simple, a required space in the door thickness direction can be small, thereby enabling the present structure to be applied to the sliding door 1 of a thin type. Also, since the tough-rubber sheath cable is used as the door side wiring harness 6, arranging work and end-treating work thereof such as cutting, peeling, and pressure-welding to a terminal can be easy.

Further, since the door side wiring harness 6 is secured by the pressing plate 34 with use of the small screw 37 to the sliding block 4, the wiring harness 6 can be attached or detached easily. And, since the bent portion 38 of the door side wiring harness 6 is bent in a U-shape between the sliding block 4 and the body side, a bending movement of the wiring harness 6 can be smoothly done when the sliding door 1 is opened or closed and simultaneously extension and shrinkage do not arise on the wiring harness 6, thereby preventing damage of the wiring harness 6. In particular, since the coil springs 39–41 are fitted on the bent portion 38, the bent portion 38 can be protected and simultaneously form-retaining of the bent portion 38 can be done, whereby an absorbing effect for extension and shrinkage of the wiring harness 6 can be improved and also the sliding block 4 can be located at a predetermined position on the guide rail 3 of the sliding door 1 when the sliding door 1 is opened or closed, thereby preventing such unnecessary movement of the swing portion 48 of the wiring harness 6 as a flutter or the like. Besides, since the reel 5 restrains unnecessary movement of the sliding block 4 when the sliding door 1 is opened or closed, the sliding block 4 can be located at a predetermined position on the guide rail 3 during the opening or closing operation of the sliding door 1, thereby bringing about the similar effects as described above.

Next, FIGS. 10–15 show a second embodiment of an electricity supplying structure (or mechanism) on motor vehicle sliding door in accordance with the present invention.

Figure 10:
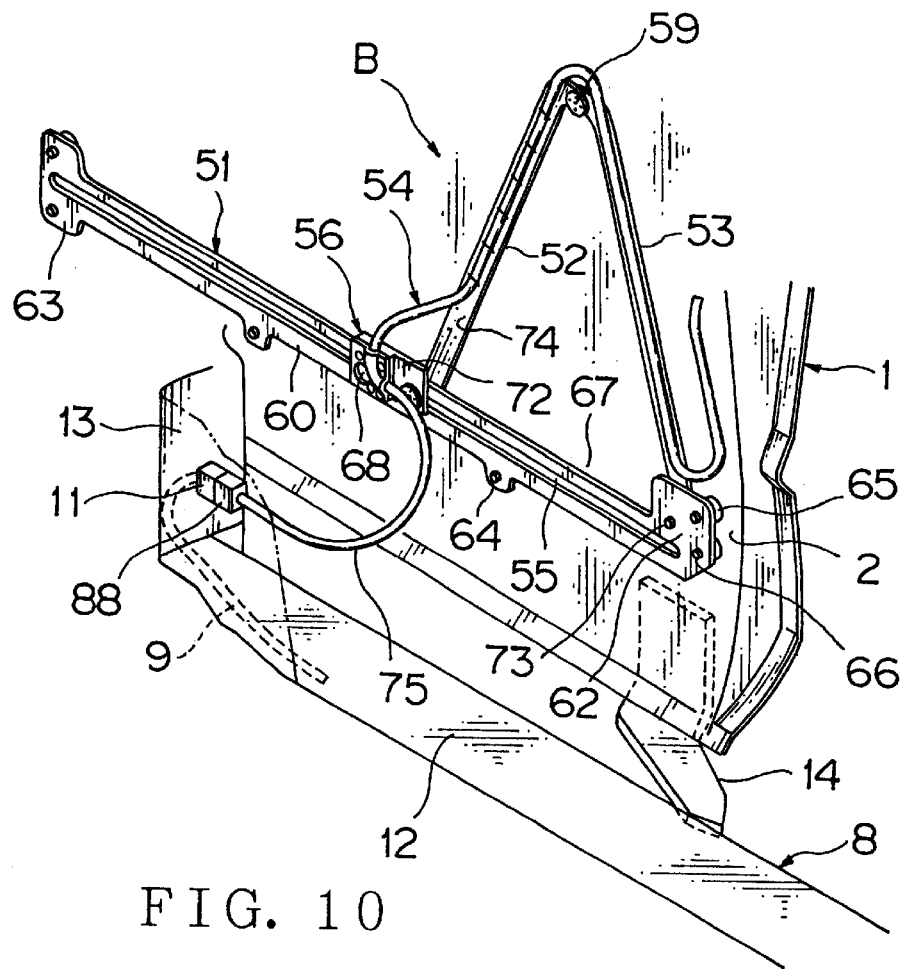
FIG. 10 is a perspective view showing a second embodiment of an electricity supplying structure on motor vehicle sliding door in accordance with the present invention.

As shown in FIG. 10, an electricity supplying mechanism B on motor vehicle sliding door of the present embodiment does not have the reel 5 (FIG. 1) and is provided with a pair of linking arms 52,53 on a guide rail 51. And, a door side wiring harness 54 is arranged along the linking arms 52,53.

Figure 11:
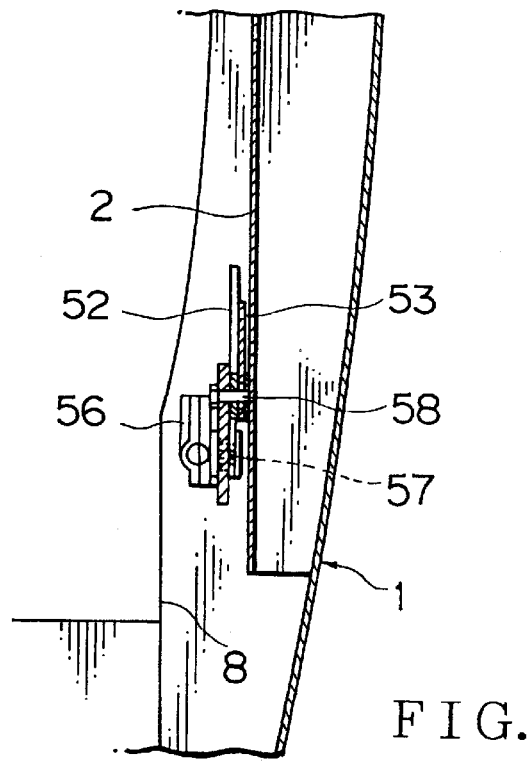
FIG. 11 is a side view, partly in section, showing an assembled state of linking

Similarly to the previous embodiment, the guide rail 51 is horizontally arranged at the lower portion of the inner panel 2 of the sliding door 1 and a slit 55 of the guide rail 51 is slidably engaged with a sliding block (i.e. a slider) 56. The sliding block 56 is pivotally connected with one end portion of the first linking arm 52 by means of an axis portion 57 (FIG. 11). One end portion of the second linking arm 53 is pivotally connected to the front end of the guide rail 51 by means of an axis portion 58 (FIG. 11), and the other end portion of the first linking arm 52 and the other end portion of the second linking arm 53 is linked with a linking axis 59. The linking arms 52,53 stand in a reversed-V state. The other structure is substantially the same as of the first embodiment. That is, the electricity supplying mechanism B on motor vehicle sliding door has the guide rail 51, the sliding block 56, and the linking arms 52,53.

Similarly to the previous embodiment, the guide rail 51 is formed with the slit 55 in the vertical middle of a straight plate portion 60, and the plate portion 60 is provided with secured portions 62–64 at the both ends and in the horizontal middle thereof. Each of the secured portions 62–64 is fixed to the inner panel 2 with a ring spacer 65 and a bolt 66, which spacer 65 makes a gap 67 between the inner panel 2 and the guide rail 51.

And, the slit 55 of the guide rail 51 is engaged with a supporting axis 68 of the sliding block 56, that is, a flange portion 69 (FIG. 13) formed at the end of the supporting axis 68 is positioned in the gap 67 at the back of the guide rail 51. The supporting axis 68 is provided with a bearing 70 (FIG. 13) on the periphery so that the sliding block 56 can smoothly move along the slit 55.

And, the one end portion of the first linking arm 52 is connected to a front half portion (i.e. a thin portion) 72 of the sliding block 56 by means of an axis portion 71 (FIGS. 12,13) at the back of the guide rail 51. The one end portion of the first linking arm 52 is located in the gap 67 and slides on the back of the guide rail 51 along with the sliding block 56.

The other end portions of the respective first and second linking arms 52,53 lap each other and are linked with the axis portion 59. One end portion of the second linking arm 53 is pivotally connected to the back of a secured portion 62 at an front end side of the guide rail 51 by means of an axis portion 73. The one end portion of the second linking arm 53 is also located in the gap 67. The link structure of the linking arms 52,53 will be described later.

In FIG. 10, the door side wiring harness 54 is arranged from the sliding block 56 along the first linking arm 52 and the second linking arm 53 substantially in a reversed-V state, is bent upward from a lower end side of the second linking arm 53 in a U-shape, and is connected to a wiring harness (not shown), by means of a connector, connected with auxiliary units installed inside the sliding door 1. The wiring harness 54 is secured to the linking arms 52,53 by a securing means (not shown). The linking arms 52,53 are provided, for example, with pluralities of securing holes 74 for securing the wiring harness 54. The wiring harness 54 has a little extra over the axis portion 59.

On movement of the sliding block 56 the linking arms 52,53 with the wiring harness 54 are opened or closed. The linking arms 52,53 prevent the wiring harness 54 from hanging down and tangling. Also, the linking arms 52,53 work similarly to the reel S (FIG. 1) of the previous embodiment in terms of helping the movement of the sliding block 56.

The linking arms 52,53 shall be arranged over the guide rail 51 and be in a reversed-V state, whereby the linking arms 52,53 are likely to open each other due to their own weight, thereby facilitating the sliding block 67 to move rearward. Force for moving the sliding block 56 rearward due to the weight of the linking arms 52,53 gradually increases as increasing angle of the linking arms 52,53, and when the sliding door 1 is fully opened, the sliding block 56 can be securely shifted to the rear end side of the guide rail 51.

Figure 12:
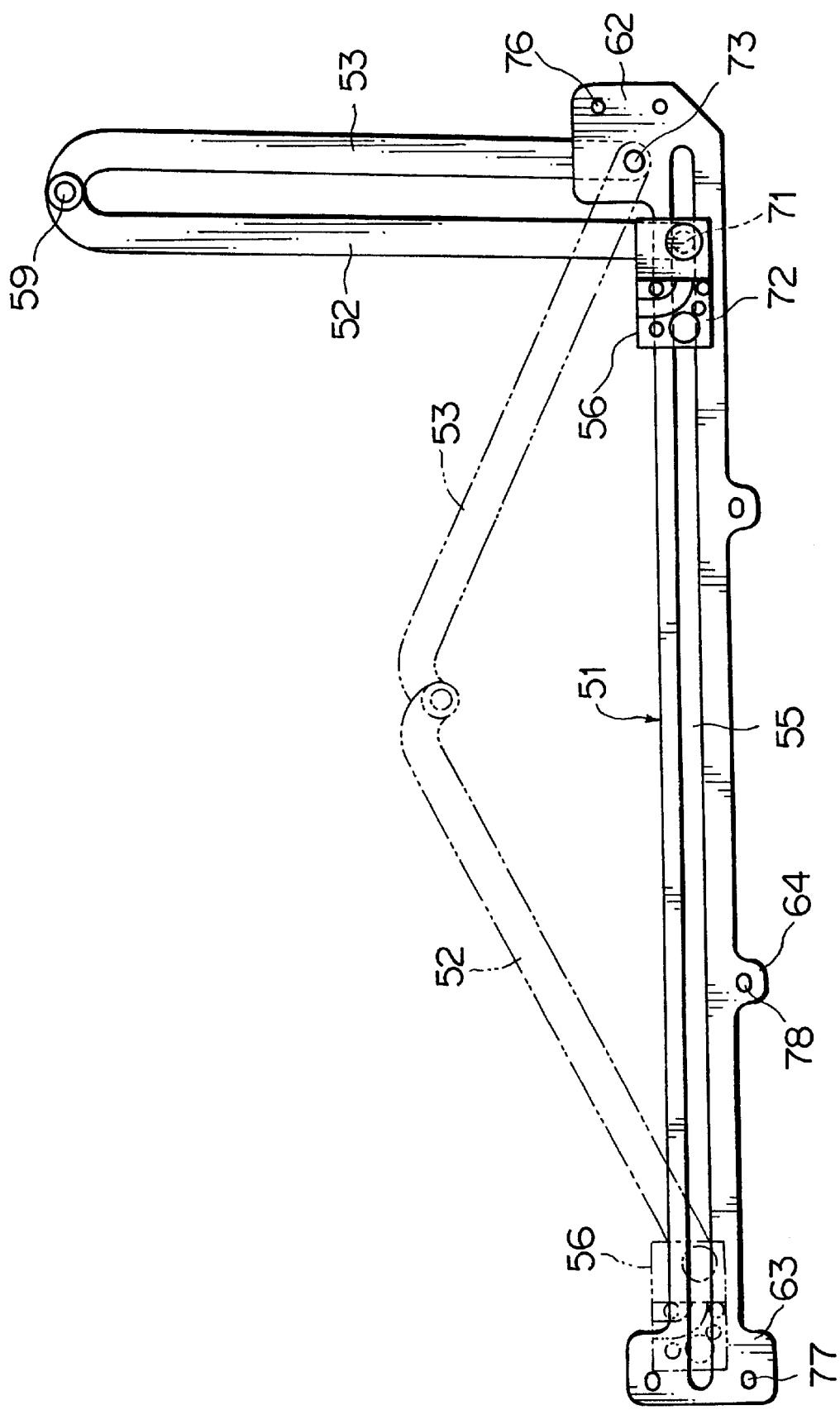
FIG. 12 is a front view showing a working state of the linking arms on a guide rail.

As shown in FIG. 12, in a fully opened state of the sliding door 1 (FIG. 10) the linking arms 52,53 vertical stand as shown with a solid line, and in a fully closed state thereof the linking arms 52,53 open each other as shown with a chain line. If the linking arms 52,53 are arranged in a thoroughly horizontal line in the fully closed state of the sliding door 1, the linking arms 52,53 do not return to the reversed-V state and this would lock the sliding door 1 (FIG. 10). Therefore, the linking arms 52,53 shall be bent a little in the fully closed state of the sliding door 1. Since the linking arms 52,53 are pushing the sliding block 56 rearward in the fully closed state of the sliding door 1, movement of the sliding block 56 is prevented during a run of the vehicle, thereby preventing the door side wiring harness 54 (FIG. 10) from slackening, wearing, making a noise, or the like caused by the slack.

When the linking arms 52,53 change from their closed state to their opened state, the axis portion 59 of the linking arms 52,53 moves in an arc. The opening-closing movement of the linking arms 52,53 is due to relative movement of the sliding block 56 against the guide rail 51 though the sliding block 56 remains almost still due to the bent portion 75 of the wiring harness 54 (FIG. 10).

As described above, one end portion of the first linking arm 52 is connected to the thin portion 72 of the sliding block 56 by means of the axis portion 71, and one end portion of the second linking arm 53 is pivotally connected to the secured portion 62 at the front end side of the guide rail 51 by means of the axis portion 73. The secured portion 62 projects above the slit 55, and the axis portion 73 is positioned above the front end of the slit 55. The axis portion 71 of the first linking arm 52 is put through the slit 55 and the second linking arm 52 is formed a little shorter than the first liking arm 52, so that the first linking arm 52 is capable of easily opening or closing. The guide rail 51 is provided with bolting holes 76–78 on the secured portions 62–64, respectively, which secured portion 64 is positioned between the secured portions 62,63.

Figure 13:
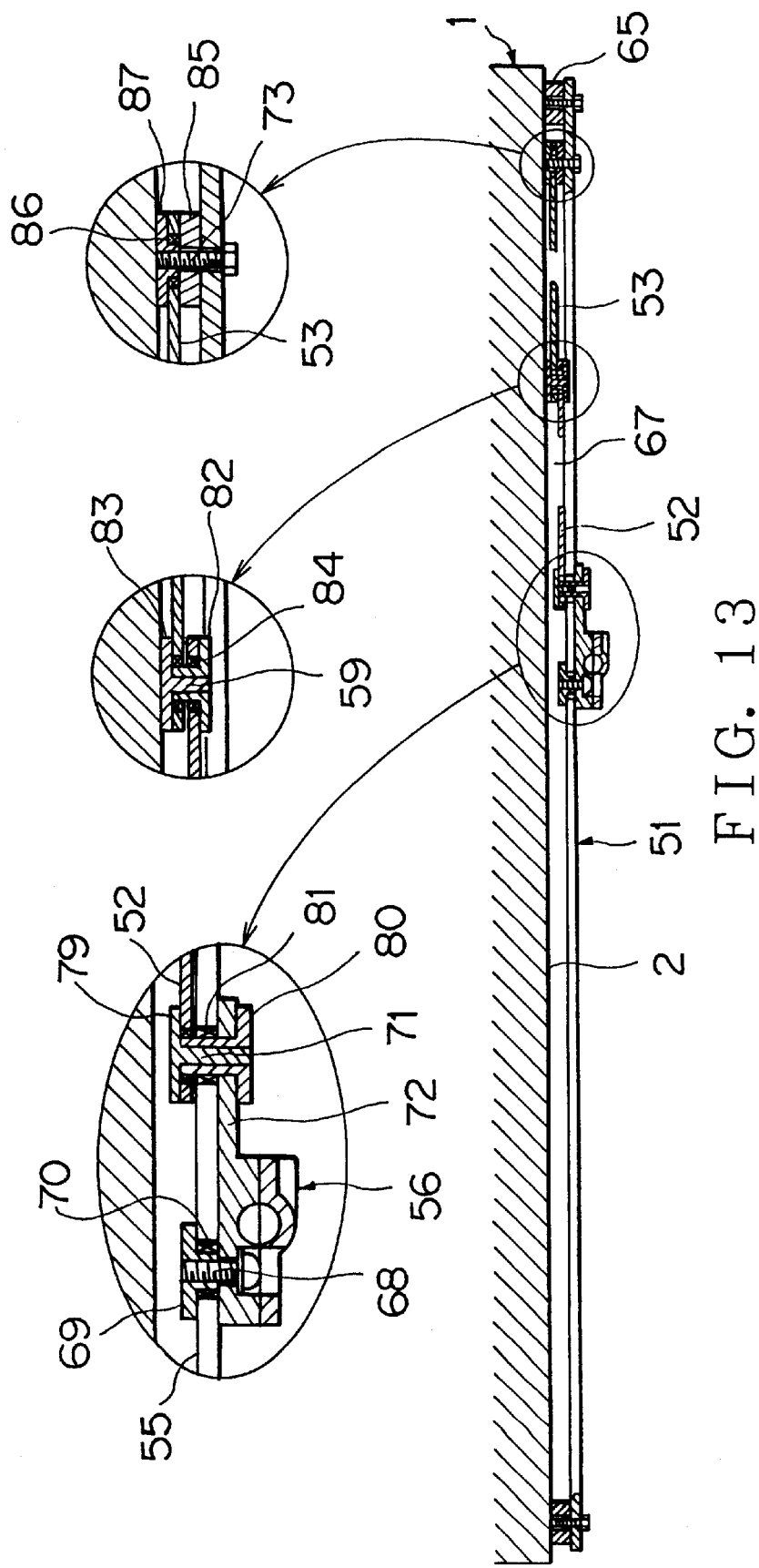
FIG. 13 is a plan view, partly in section, showing a setting state of the linking arms.

As shown in FIG. 13, there exists the gap 67 due to the spacer 65 between the guide rail 51 and the inner panel 2 of the sliding door 1. In the gap 67 the end portions of the first linking arm 52 and the second linking arm 53 are located. The sliding block 56 slidably engages the slit 55 of the guide rail 51 by means of such a bolt as the supporting axis 68. The supporting axis 68 is fitted with a bearing 70 so that the supporting axis 68 is capable of sliding smoothly in the slit 55, and the supporting axis 68 is provided with a flange portion 69 at the end thereof so that axial movement of the supporting axis 68 is restricted.

And, the axis portion 71 is put through the thin portion 72 of the sliding block 56, the slit 55 of the guide rail 51, and one end portion of the first linking arm 52, and the axis portion 71 is provided with flange portions 79,80 at the both ends thereof. The axis portion 71 is fitted with two bearings 81 for respective portions relative to the slit 55 and to the end portion of the first linking arm 52 so that the axis portion 71 is capable of sliding smoothly in the slit 55 and so that the first linking arm 52 is capable of smoothly pivoting on the axis portion 71. The sliding block 56 slides stable in the slit 55 with the supporting axis 68 and the axis portion 71.

And, the axis portion 59 is put through the other end portions of the respective first and second linking arms 52,53, and the axis portion 59 is provided with flange portions 82,83 at the both ends thereof. The axis portion 59 is fitted with a bearing 84 so that the linking arms 52,53 are capable of smoothly pivoting on the axis portion 59.

And, the one end portion of the second linking arm 53 is connected to the back of the secured portion 62 with a spacer 85, and the axis portion 73, i.e. a bolt, is put through the end portion and the spacer 85. The axis portion 73 is fitted with a bearing 86 for respective portions relative to the slit 55 and to the end portion of the first linking arm 52 so that the axis portion 71 is capable of sliding smoothly in the slit 55 and so that the first linking arm 52 is capable of smoothly pivoting on the axis portion 71. The sliding block 56 slides stable in the slit 55 with the supporting axis 68 and the axis portion 71. The axis portion 73 is fitted with a bearing 86 so that the second linking arm 53 is capable of smoothly pivoting on the axis portion 73. The axis portion 73 is screwed into the inner panel 2 through the flange portion 87.

In FIG. 10, a lower portion of the wiring harness 54, that is, a bent portion 75 formed in a substantially U-shape between the sliding block 56 to the body 8 side, bends forward and is connected to a connector 88 which is coupled with a mating connector 11 connected to the body side wiring harness 9 as an electricity supplying line. The body side wiring harness 9 extends forward to a battery side along an inside of a wall of the step 12.

Figure 14:
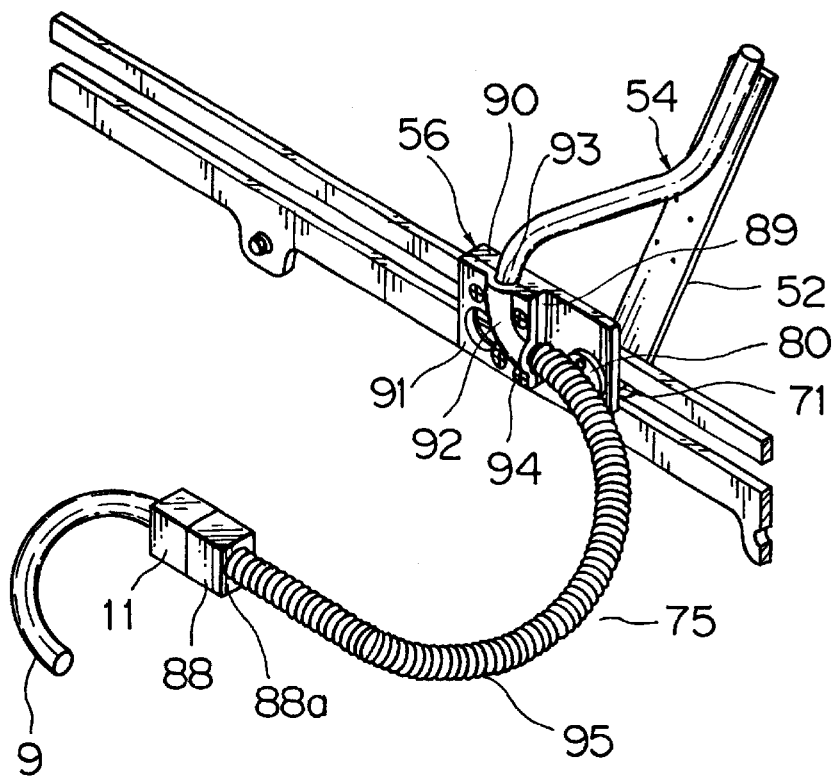
FIG. 14 is a perspective view showing an embodiment of a bent portion of a wiring harness.

As shown in FIG. 14, the sliding block 56 is formed in rectangle and has a step portion 89 in the horizontal middle thereof. A bent portion 75 of the door side wiring harness 54 projects forward from the step portion 89 over the flange portion 80 of the axis portion 71 of the first linking arm 52 and bends substantially downward. Similarly to the previous embodiment, the rear half portion of the sliding block 56 is formed thick as a thick portion 90 to which a pressing plate 91 is secured for putting the wiring harness 54 therebetween. The pressing plate 91 is formed with an arched portion 92 bulging outward and bending by approximately 90 degrees, and the thick portion 90 is provided with a groove 93 relative to the arched portion 92. And, the pressing plate 91 is secured to the thick portion 90 with small screws 94, and the wiring harness 54 is put between the groove 93 and the arched portion 92.

Also, similarly to the previous embodiment, a coil spring (i.e. a coil member) 95 is put around the bent portion 75 of the door side wiring harness 54. The coil spring 95 protects the bent portion 75 against wear or the like, keeps the bent portion 75 in a smoothly bent shape, and prevents the bent portion 75 from being folded or from winding due to a movement of the sliding block 56 thereby to prevent a breakage of the bent portion 75. Both ends of the coil spring 95 push the step portion 89 of the sliding block 56 and an end plane 88*a* of the connector 88, respectively, due to its spring force without parting from the step portion 89 and the end plane 88*a*.

Figure 15:
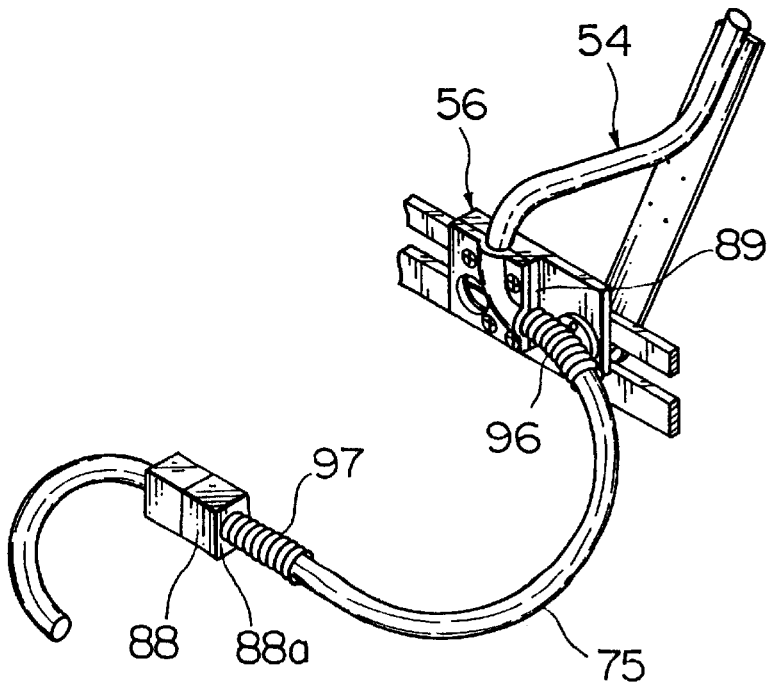
FIG. 15 is a perspective view showing another embodiment of a bent portion of a wiring harness.
Figure 16:
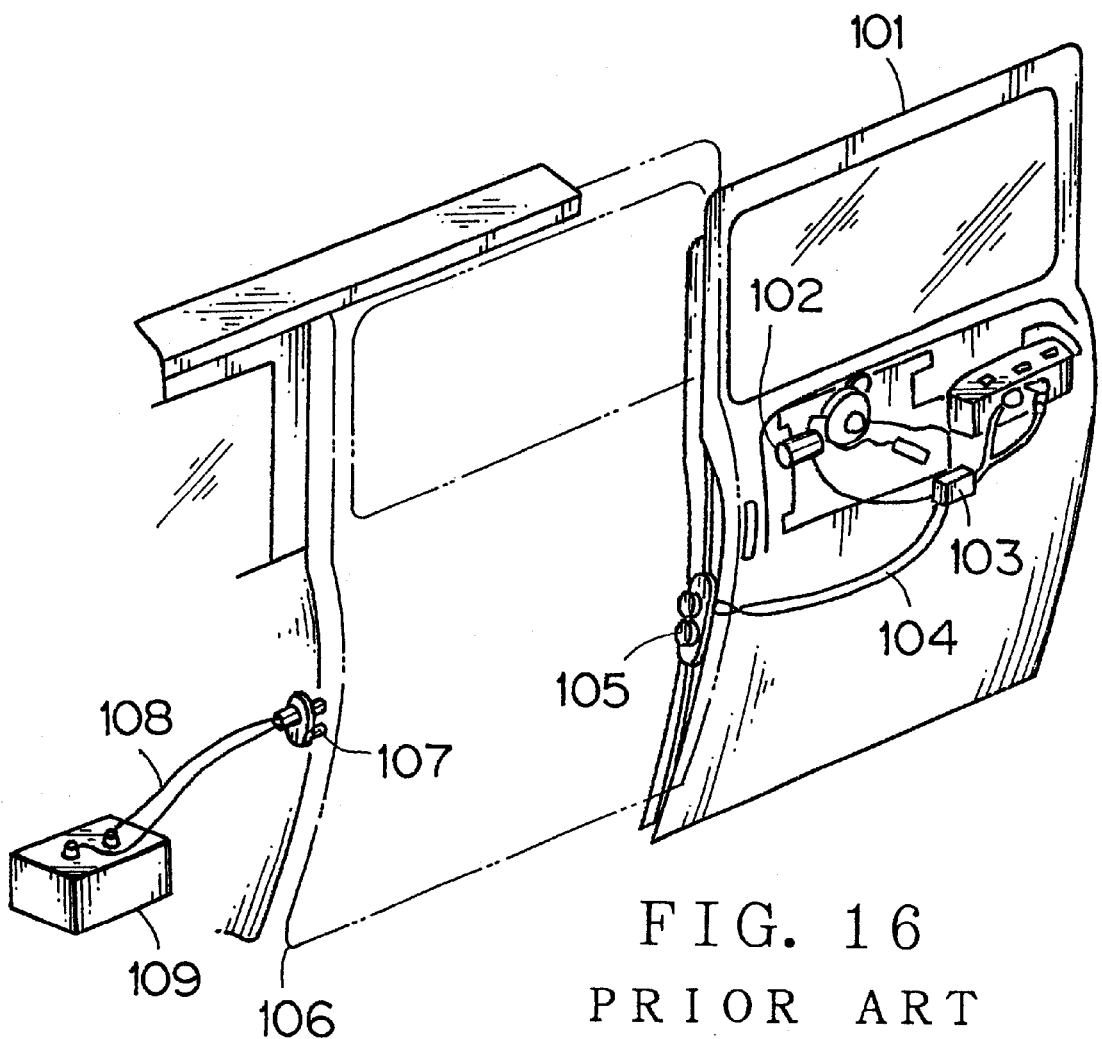
FIG. 16 is a perspective view showing a prior art electricity supplying structure on motor vehicle sliding door.
Figure 17A:
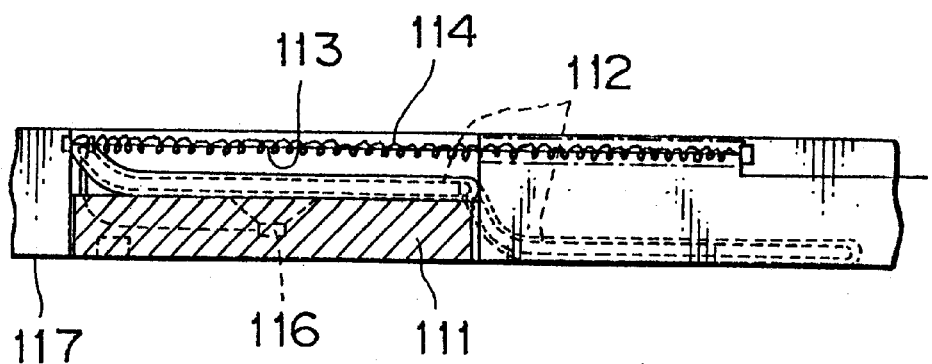
FIG. 17A is a longitudinal-sectional view showing another prior art electricity supplying structure on motor vehicle sliding door in a door-closed state.
Figure 17B:
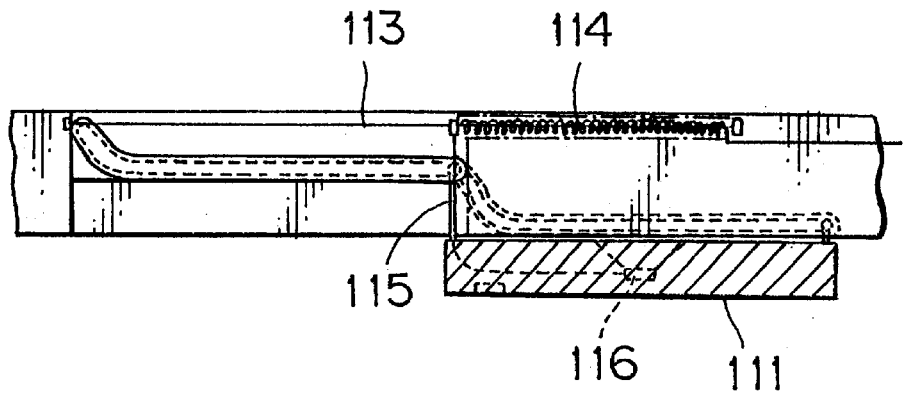
FIG. 17B is a longitudinal-sectional view showing another prior art electricity supplying structure on motor vehicle sliding door in a door-opened state.
Figure 18A:
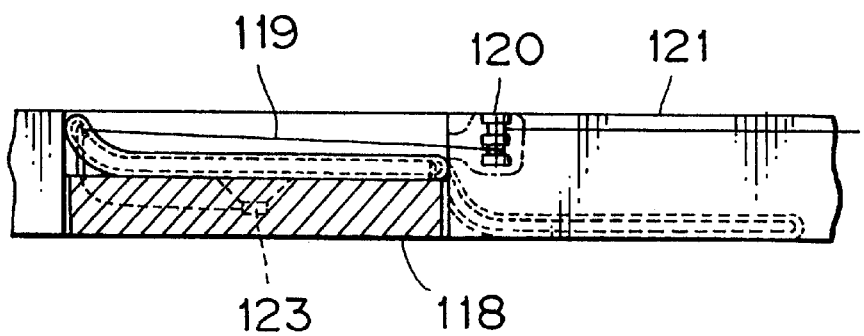
FIG. 18A is a longitudinal-sectional view showing still another prior art electricity supplying structure on motor vehicle sliding door in a door-closed state.
Figure 18B:
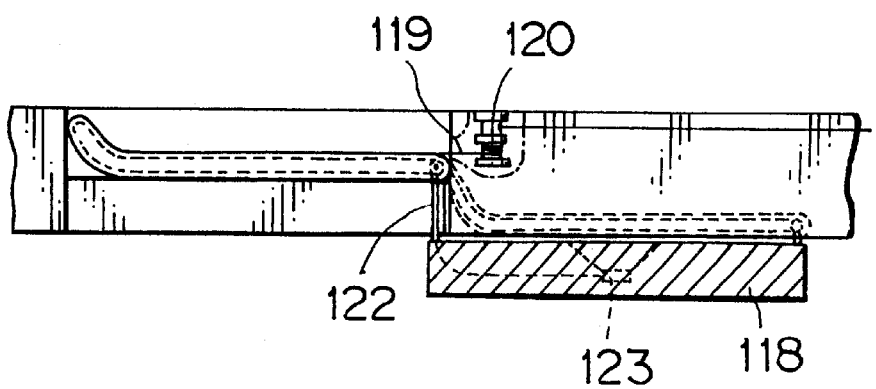
FIG. 18B is a longitudinal-sectional view showing still another prior art electricity supplying structure on motor vehicle sliding door in a door-opened state.

As shown in FIG. 15, coil springs (i.e. as a coil member) 96,97 may partially be provided at a sliding block 56 side and a connector 88 side of the bent portion 75. That is, the ends of the coil springs 96,97 are secured to the step portion 89 of the sliding block 56 and the end plane 88*a* of the connector 88. Similarly to the embodiment shown in FIG. 14, the coil springs 96,97 may be fitted on the periphery of the bent portion 75. Since the both end portions of the bent portion 75 are supported by the coil springs 96,97, the bent portion 75 are kept in a U-shape against movement of the sliding block 56.

Similarly to the previous embodiment (shown in FIG. 4), the wiring harness 54 is of a tough-rubber sheath cable. Since the tough-rubber sheath cable enables the wiring harness 54 to have a completely circular cross-section, the wiring harness 54 should have a uniform bending property in all directions, thereby facilitating arranging work thereof onto the linking arms 52,53 and continuously to the connector 88 through the sliding block 56. This wiring harness 54 also has a good form-retaining property suitable for the bent portion 75, and also facilitates end-treating work thereof such as cutting, peeling, and pressure-welding to a terminal.

Referring to FIG. 10, the connectors 88,11 of the door side and body side wiring harnesses 54,9 are fixed inside a vertical wall 13 of a step portion 12 of the body 8. The sliding door 1 slidably engages a rail 15 (FIG. 7) provided on the body 8 by means of a hinge roller 14 at the lower end of the sliding door 1. Similarly to the previous embodiment, since the bent portion 75 of the wiring harness 54 is connected to the body 8, the sliding block 56 is positioned at the front end of the guide rail 51 in the opened state of the sliding door 1. Actually, the sliding block 56 remains the same position as of closed state of the sliding door 1, while the sliding door 1 has shifted rearward.

The action shown in FIGS. 7–9 in the first embodiment is applicable to the present embodiment by replacing a reference numeral 38 with a numeral 75. That is, as shown in FIG. 7, the sliding door 1 is positioned, in the closed state thereof, with the outer surface thereof being in the same plane as of the body 8. The hinge roller 14 at a lower end side of the sliding door 1 is positioned at the front end of a slant portion 15*a* of the rail 15. The bent portion 75 of the door side wiring harness 54 (FIG. 10) is located at the rear end of the sliding door 1 in a substantially U-shape.

As shown in FIG. 8, on the way to the opened state of the sliding door 1, the sliding door 1 projects outward due to the bent rail 15. The sliding block 56 (FIG. 10) is also on the way on the guide rail 51 (FIG. 10) of the sliding door 1 and the bent portion 75 of the wiring harness 54 (FIG. 10) bends in a widely opened U-shape. The hinge roller 14 shifts from the slant portion 15*a* of the rail 15 to its straight portion 15*b*.

As shown in FIG. 9, the sliding door 1 is positioned, in the opened state thereof, parallel to the outer surface of the body 8, and the hinge roller 14 is positioned at a rear end side of the straight portion 15b of the rail 15. The sliding block 56 (FIG. 10) is located at the front end side of the sliding door 1, and the bent portion 75 of the wiring harness 54 (FIG. 10) is pulled rearward a little.

According to the present embodiment, since the structure with the sliding block 56 and the linking arms 52,53 fitted with the wiring harness 54 is simple, a required space in the door thickness direction can be small, thereby enabling the present structure to be applied to the sliding door 1 of a thin type. And, since the wiring harness 54 is supported by a pair of linking arms 52,53, the wiring harness 54 is prevented from hanging down and tangling when the sliding door 1 is opened or closed, thereby protecting the wiring harness 54 from wear due to contact and friction with the inner panel 2. Also, since the sliding block 56 securely shifts to the predetermined position, when the sliding door 1 is closed, due to the weight of the linking arms 52,53, the bent portion 75 of the wiring harness 54 can be prevented from being forcibly pulled, thereby also preventing the connector 88 from being forcibly pulled.

Further, similarly to the previous embodiment, since the bent portion 75 is formed on the door side wiring harness 54, the door side wiring harness 54 can smoothly respond to three-dimensional opening-closing movement of the sliding door 1, and since the tough-rubber sheath cable is used as the door side wiring harness 54, arranging work and end-treating work thereof such as cutting, peeling, and pressure-welding to a terminal can be easy.

Still further, also similarly to the previous embodiment, the wiring harness 54 can be attached or detached easily by means of the pressing plate 91 of the sliding block 56, a bending movement of the wiring harness 54 can be smoothly done and simultaneously extension and shrinkage do not arise on the wiring harness 54 by means of the bent portion 75, and the bent portion 75 can be protected and simultaneously form-retaining of the bent portion 75 can be done by means of the coil springs 95–97.

In the above embodiments, though the guide rail 3,51 with the sliding block 4,56 are provided on the sliding door 1, a guide rail with a sliding block may be provided on the body side.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An electricity supplying structure on a motor vehicle sliding door, disposed in a vehicle body side, comprising:
    a sliding door;
    a guide rail provided on the sliding door;
    a slider to slidably engage the guide rail; and
    a wiring harness secured to the slider and extending to the vehicle body side;
    wherein a bent portion, being in a general U-shape, is formed on the wiring harness between the slider and the vehicle body side, one end portion of the bent portion being directed in a longitudinal direction of the guide rail by the slider and another end of the bent portion being directed in the longitudinal direction of the guide rail at the vehicle body side.

2. The electricity supplying structure on a motor vehicle sliding door according to claim 1, further comprising:
    a wiring harness supporting guide provided over the guide rail for hanging the wiring harness from the wiring harness supporting guide toward the slider.

3. The electricity supplying structure on a motor vehicle sliding door according to claim 2, further comprising:
    a reel to pull the slider in a single direction.

4. The electricity supplying structure on a motor vehicle sliding door according to claim 1, wherein
    the guide rail is a plate having a slit and the slider has a supporting axis to slide in the slit.

5. The electricity supplying structure on a motor vehicle sliding door according to claim 1, further comprising:
    a coil member to be fitted on the bent portion of the wiring harness.

6. The electricity supplying structure on a motor vehicle sliding door according to claim 5, wherein
    the coil member is arranged on each of both end portions of the bent portion.

7. The electricity supplying structure on a motor vehicle sliding door according to claim 5, wherein
    the wiring harness is a tough-rubber sheath cable.

8. The electricity supplying structure on a motor vehicle sliding door according to claim 7, wherein
    one end of the bent portion of the wiring harness is connected to a connector to be coupled with a mating connector secured to the vehicle body side.

9. The electricity supplying structure on a motor vehicle sliding door according to claim 1, wherein
    the wiring harness is a tough-rubber sheath cable.

10. The electricity supplying structure on a motor vehicle sliding door according to claim 9, wherein
    one end of the bent portion of the wiring harness is connected to a connector to be coupled with a mating connector secured to the vehicle body side.

11. An electricity supplying structure on a motor vehicle sliding door, comprising:
    a sliding door;
    a guide rail provided on the sliding door;
    a slider to slidably engage the guide rail;
    a pair of linking arms being linked directly to each other, one end of the linking arms being connected to the slider and the other end of the linking arms being connected to the sliding door; and
    a wiring harness arranged by way of the pair of linking arms from said sliding door to the slider and extending from said slider to a vehicle body while forming a generally U-shaped bent portion between the slider and the vehicle body.

12. The electricity supplying structure on a motor vehicle sliding door according to claim 11, wherein
    a bent portion is formed on the wiring harness between the slider and the vehicle body.

13. The electricity supplying structure on a motor vehicle sliding door according to claim 11, wherein
    the pair of linking arms are arranged on an upper side of the guide rail.

14. The electricity supplying structure on a motor vehicle sliding door according to claim 11, wherein
    one of the pair of linking arms is connected to the slider by means of an axis portion and the axis portion engages the slit of the guide rail.

15. The electricity supplying structure on a motor vehicle sliding door according to claim 11, further comprising:
    a coil member fitted on the bent portion of the wiring harness.

16. The electricity supplying structure on a motor vehicle sliding door according to claim 15, wherein
    the coil member is arranged on each of both end portions of the bent portion.

17. The electricity supplying structure on a motor vehicle sliding door according to claim 15, wherein
    the wiring harness is a tough-rubber sheath cable.

18. The electricity supplying structure on a motor vehicle sliding door according to claim 17, wherein
    one end of the bent portion of the wiring harness is connected to a connector to be coupled with a mating connector secured to the vehicle body side.

19. The electricity supplying structure on a motor vehicle sliding door according to claim 11, wherein
    the wiring harness is a tough-rubber sheath cable.

20. The electricity supplying structure on a motor vehicle sliding door according to claim 19, wherein
    one end of the bent portion of the wiring harness is connected to a connector to be coupled with a mating connector secured to the vehicle body side.

* * * * *